UNITED STATES PATENT OFFICE.

HARRY P. BASSETT, OF CYNTHIANA, KENTUCKY.

PROCESS OF PRODUCING HARDENED-CASEIN COMPOUNDS.

1,360,356.   Specification of Letters Patent.   Patented Nov. 30, 1920.

No Drawing.   Application filed February 25, 1920.   Serial No. 361,277.

*To all whom it may concern:*

Be it known that I, HARRY P. BASSETT, a citizen of the United States, residing at Cynthiana, in the county of Harrison and State of Kentucky, have invented certain new and useful Improvements in Processes of Producing Hardened-Casein Compounds, of which the following is a specification.

This invention relates to processes of producing hardened casein compounds, and has reference to an improved process whereby a stable, horn-like product is obtained which will not shrink, warp, or discolor.

Heretofore, thermoplastic bodies have been produced from casein by precipitating the casein with a suitable casein precipitating agent, such as acetic acid, phosphoric acid, calcium chlorid, or the like, in the presence of a casein hardening agent, such as formaldehyde, hexamethyltetramin or the like, and molding the resulting mass under heat and pressure in a moist condition.

Thermoplastic casein compounds have also been produced by precipitation, hardening, and thorough drying and such compounds softened or dissolved by suitable reagents and molded under heat and pressure.

Thermoplastic compounds have also been produced by the action of converting reagents, molded under heat and pressure and later hardened by the use of hardening agents either in a gaseous or liquid state.

These processes are open to the objection that the resulting molding bodies will either shrink, warp, or discolor, or, in the case of those in which hardening follows molding, the hardening process is very time consuming.

Now, I have discovered that the disadvantages of prior processes can be overcome if the casein is precipitated in the presence of a hardening agent, the resulting thermoplastic mass dried to a certain definite degree of dryness, and molded under heat and pressure.

In the practice of my process, the casein is precipitated by the use of any suitable casein precipitating agent, preferably calcium acetate, in the presence of a suitable hardening agent, preferably formaldehyde and the resulting plastic mass air-dried, until it contains approximately from 18 to 20 per cent. by weight of moisture. When this degree of dryness is obtained, the casein is molded into any desired form, under heat and pressure.

It will be understood that the proportions of the precipitating agent and the hardening agent may be varied within wide limits, as is well known in the art. In the preferred practice of my process, I add to a given bulk of milk, more than a sufficient quantity of calcium acetate to precipitate all of the casein in the milk, and more than a sufficient quantity of formaldehyde to harden the resulting casein. I have found it advantageous to add an excess of both the precipitating and hardening agents, as the liquid remaining from the treatment of one batch of milk can be advantageously employed in the treatment of a second batch.

I have found it advantageous to air-dry the resulting precipitate, as the application of a high degree of heat has a tendency to harden the outer surface of the casein mass while the interior is still too moist to be advantageously employed in the practice of my process. A moderate degree of heat, such as from 20 to 30° C. may be employed without injuriously affecting the plastic mass under treatment. A higher degree of heat than 30° C. should not be employed, as it is important that the percentage of moisture should be substantially uniform throughout the casein mass.

The molding can be advantageously carried out at a temperature of 140° C., or above. The temperature of the mold can, however, be raised to any temperature which is insufficient to scorch or burn the casein compound.

Various substances may be incorporated into the casein compound, such for example, as gums or resins, coloring matter, or fillers, such as magnesium oxid, zinc oxid, powdered silicia, talc or the like. In incorporating these substances into the casein compound, I have found it advantageous to mix them with the milk or other casein solution. By following this procedure and stirring the milk or other casein solution during the precipitating process, the added substances are substantially uniformly incorporated throughout the resulting mass.

While I have described my process with reference to the treatment of milk or other casein solution, it will be apparent that my process is adapted for the preparation of horn or celluloid-like material from any albumenoid or proteid solution, such as blood, albumen, vegetable proteid solutions, and the like.

Casein compounds produced in accordance with the practice of my process where no coloring pigment, filler, or other material is added, is a white, horn-like mass which is water and acid proof, a good electrical insulator, and generally adapted for use as a substitute for ebonite, celluloid, bakelite, ivory, and the like. It is transparent, translucent, or opaque, according to the precipitating agent which I employ. By the use of acetic acid, I am able to obtain a compound which is practically transparent. If a mixture of acetic acid and calcium acetate is employed as the precipitating agent, the final product is semi-transparent or translucent. If calcium acetate alone is employed as a precipitating agent, the resulting mass is practically opaque.

While I have described in detail, the preferred practice of my process, it will be understood that the proportions of ingredients and the details of procedure may be widely varied and that known chemical equivalents of the reagents employed may be used, all without departing from the spirit of my invention, or the scope of the subjoined claims.

Having thus described my invention, I claim:

1. The herein described process which consists in precipitating casein in the presence of a casein hardening agent, drying the precipitate until it contains approximately from 18 to 20 per cent. by weight of moisture, and molding the product under heat and pressure.

2. The herein described process which consists in precipitating casein from a casein containing solution in the presence of a casein hardening agent, air-drying the resulting plastic mass until it contains approximately from 18 to 20 per cent. by weight of moisture, and molding the resulting product under heat and pressure.

3. The herein described process which consists in subjecting milk to the action of a casein converting agent in the presence of a casein hardening agent, drying the resulting plastic mass until it contains approximately from 18 to 20 per cent. by weight of moisture, and molding the product under heat and pressure.

4. The herein described process which consists in subjecting a casein solution to the action of a casein precipitating agent in the presence of formaldehyde, drying the resulting plastic mass until it contains approximately from 18 to 20 per cent. by weight of moisture, and molding the resulting product under heat and pressure.

5. The herein described process which consists in treating a casein solution with acetic acid in the presence of formaldehyde, drying the resulting plastic mass until it contains approximately from 18 to 20 per cent. by weight of moisture, and molding the resulting product under heat and pressure.

6. The herein described process which consists in adding to a casein containing liquid, a substance desired to be incorporated into the finished casein mass, adding a casein precipitating agent and a casein hardening agent to such liquid while agitating the solution, partially drying the resulting precipitate and molding the precipitate under heat and pressure.

In testimony whereof I affix my signature in presence of two witnesses.

HARRY P. BASSETT.

Witnesses:
JAMES L. CRAWFORD,
C. L. PARKER.